United States Patent
Hoff

(10) Patent No.: US 9,434,206 B2
(45) Date of Patent: Sep. 6, 2016

(54) METHOD FOR PRODUCING A DECORATED WALL, CEILING OR FLOOR PANEL

(75) Inventor: Egon Hoff, Mastershausen (DE)

(73) Assignee: SURFACE TECHNOLOGIES GMBH & CO. KG, Baruth (DE)

( * ) Notice: Subject to any disclaimer, the term of this patent is extended or adjusted under 35 U.S.C. 154(b) by 294 days.

(21) Appl. No.: 14/236,297

(22) PCT Filed: Jul. 27, 2012

(86) PCT No.: PCT/EP2012/064791
§ 371 (c)(1),
(2), (4) Date: Jan. 30, 2014

(87) PCT Pub. No.: WO2013/017543
PCT Pub. Date: Feb. 7, 2013

(65) Prior Publication Data
US 2014/0199529 A1    Jul. 17, 2014

(30) Foreign Application Priority Data
Aug. 2, 2011 (DE) .................. 10 2011 080 300

(51) Int. Cl.
| | | |
|---|---|---|
| *B44C 5/04* | (2006.01) | |
| *E04F 13/08* | (2006.01) | |
| *E04F 15/10* | (2006.01) | |
| *B32B 37/02* | (2006.01) | |
| *B32B 37/10* | (2006.01) | |
| *B32B 37/14* | (2006.01) | |
| *B32B 38/08* | (2006.01) | |
| *E04C 2/26* | (2006.01) | |
| *B32B 37/04* | (2006.01) | |
| *B32B 27/00* | (2006.01) | |
| *C09J 4/00* | (2006.01) | |

(52) U.S. Cl.
CPC ............... *B44C 5/04* (2013.01); *B44C 5/0461* (2013.01); *B44C 5/0476* (2013.01); *E04C 2/26* (2013.01); *E04F 13/0866* (2013.01); *E04F 15/107* (2013.01); *B32B 27/00* (2013.01); *C09J 4/00* (2013.01); *Y10T 156/1089* (2015.01); *Y10T 156/1093* (2015.01); *Y10T 428/2481* (2015.01)

(58) Field of Classification Search
CPC ..... B44C 5/04; B44C 5/0461; B44C 5/0476; E04C 2/26; E04F 13/0866; E04F 15/107; Y10T 428/2481; Y10T 156/1089; Y10T 156/1093; C09J 4/00; B32B 27/00
USPC .............................. 156/277, 307.3
See application file for complete search history.

(56) References Cited

U.S. PATENT DOCUMENTS

| | | | | |
|---|---|---|---|---|
| 6,384,101 | B1 * | 5/2002 | Park ..................... | C09D 175/16 522/71 |
| 7,169,460 | B1 | 1/2007 | Chen et al. | |
| 2003/0180509 | A1 * | 9/2003 | Wright, Jr. ............... | B44C 1/24 428/195.1 |
| 2005/0028921 | A1 * | 2/2005 | Stroup .................... | E06B 3/822 156/182 |
| 2010/0307675 | A1 | 12/2010 | Buhlmann | |

FOREIGN PATENT DOCUMENTS

| | | | |
|---|---|---|---|
| CA | 2327142 A1 | 6/2001 | |
| CN | 2568745 Y | 8/2003 | |
| DE | 2926983 A1 | 1/1981 | |
| DE | 102007062941 A1 * | 6/2009 | ............... B44C 3/02 |
| EP | 1207051 A2 | 5/2002 | |
| EP | 1977909 A2 | 10/2008 | |
| JP | 2001113638 A | 4/2001 | |
| JP | 201076125 A | 4/2010 | |
| WO | 0020706 A1 | 4/2000 | |

OTHER PUBLICATIONS

Written Opinion of PCT/EP2012/064791.*
English translation of JP2001113638.*
English translation of JP2010076125.*
English translation of CN2568745.*
English translation of DE2926983.*
English translation of EP1977909.*
English translation of DE102007062941.*
International Search Report, PCT/EP2012/064791, dated Oct. 9, 2012, 4 pages.
International Preliminary Report on Patentability, PCT/EP2012/064791, dated Feb. 4, 2014, 8 pages.
Abstract of DE2926983A1.
Abstract of EP1977909A2.
Abstract of JP2010076125A.
Abstract of JP201113638A.

* cited by examiner

*Primary Examiner* — Sonya Mazumdar
(74) *Attorney, Agent, or Firm* — Senniger Powers LLP

(57) ABSTRACT

For simpler production of a waterproof, decorated wall, ceiling or floor panel with improved quality, the invention proposes a process involving the following steps: provision of a panel-shaped carrier and a non-woven fabric, application of an adhesive to one surface of the carrier or to a surface of the non-woven fabric, lamination of the non-woven fabric by means of the applied adhesive to the surface of the carrier, impregnation of the non-woven fabric with a liquid means, hardening of the impregnating agent, application of a sealing layer as a liquid composition and hardening of the sealing layer and/or application of a top layer as a liquid composition and hardening of the top layer.

22 Claims, No Drawings

METHOD FOR PRODUCING A DECORATED WALL, CEILING OR FLOOR PANEL

REFERENCE TO RELATED APPLICATIONS

This application is a U.S. national stage application of International Patent Application No. PCT/EP2012/064791, filed Jul. 27, 2012, and claims the benefit of German Application No. 102011080300.9, filed Aug. 2, 2011, the entire disclosures of which are incorporated herein by reference.

FIELD OF THE INVENTION

The invention relates to a method for producing a decorated wall, ceiling or floor panel as well as wall, ceiling or floor panels produced according to this method.

BACKGROUND

Such decorated panels are known per se. They typically consist of a carrier or core made of a solid material, such as a wood material, which on at least one side is provided with a decorative layer and a top layer as well as possibly with further layers, such as a wearing layer, interposed between the decorative and the top layers. The decorative layer normally is a printed paper impregnated with an aminoplastic resin. The decorative layer and the remaining layers are usually made of aminoplastic resin, too.

Herein aminoplastic resins are understood to include amino resins or amide resins which can be cured to melamine resins based duroplastics.

These panels are often not suited for use in wet rooms, such as bath rooms, showers etc., because particularly the decorative layer is modified by penetrating moisture, such as by swelling. Thus, there is a need for a generic panel with an improved stability against moisture.

EP-2248665 A1 discloses planks with an improved resistance against moisture. They comprise a core made of a thermoplastic material and a decorative layer attached to the surface of the core as well as a protective layer. The decorative layer is a printed paper impregnated with an aminoplastic resin and the protective layer is a so-called overlay paper which is impregnated with aminoplast resin, too, and can include wear-resistant particles. Alternatively the decor can be printed directly onto the thermoplastic core or onto a thermoplastic foil without the use of a paper. The decorative paper or foil is adhered to the thermoplastic core by means of an adhesive.

However, the production of such a decorative panel is labour-intensive because it is required to produce and to stockpile the impregnated decorative paper and the overlay paper separately. The same applies to the possibly used printed thermoplastic foil which, moreover, is relative expensive.

SUMMARY OF THE INVENTION

Thus, it is an object of the invention to provide a method by which a watertight decorated wall, ceiling or floor panel can be produced substantially easier and more cost-effective and with an improved quality.

This object is achieved by a method according to the main claim.

DETAILED DESCRIPTION OF PREFERRED EMBODIMENTS

Indeed, it was found that a non-woven fabric adhered onto the core can be impregnated even in this state. Herein, by selecting the impregnation agent the non-woven fabric can be impregnated completely and, thus, be protected entirely against the influence of moisture.

Many plate-shaped materials to be used in the interior construction are suited as the core. These include plastics, particularly thermoplastic, elastomeric or duroplastic materials, paper, cardboard as well as plates made of minerals such as natural and synthetic stone slabs, concrete slabs, gypsum fibre boards, so-called WPC-panels (made of a mixture of plastics and wood) as well as plates made of natural raw materials such as cork and wood. Even plates made of biomass such as straw, maize straw, bamboo, leaves, algae extracts, hemp, oil palm fibres, can be used. Moreover, recycled materials from the abovementioned materials can be used.

The carrier plate material—according to the desired physical properties of the finished panel—can be compact dense or can comprise more or less cavities, for example, it can be foamed or comprise cavities the size of which corresponds to the magnitude of the panel dimensions. Even laminate structures configured of a plurality of the abovementioned materials can be used, such as gypsum board or wood-plastics laminate panels.

Preferred panel materials are thermoplastics such as polyvinyl chloride, polyolefines (such as polyethylene (PE), polypropylene (PP)), polyamides (PA), polyurethanes (PU), polystyrene (PS), acrylonitrile butadiene styrene (ABS), polymethyl methacrylate (PMME), polycarbonate (PC), polyethylene terephthalate (PET), polyether ether ketone (PEEK) or mixtures or copolymerizates thereof.

The plastic materials can include common fillers, such as calcium carbonate (chalk), aluminum oxide, silicagel, quartz powder, wood flour, gypsum. In addition they can be coloured in a known way.

Moreover, the plastic materials can include plasticizers in order to influence the strength of the product in a desired way. In addition, further additives such as photostabilizers can be included.

These thermoplastic materials also offer the advantage that the products produced therefrom can be recycled very easily. Moreover, recycled materials from other sources can be used. This offers the possibility of a reduction of the production costs.

The non-woven fabric used according to the invention preferably consists of cellulose. Other non-woven fabrics, for example those made of synthetic fibres, such as polyamide or polyester, can also be used. Appropriate non-woven fabrics have an area density of ≥10 to ≤200 g per square meter and a pore volume of ≥10 to <60%. Preferred are cellulose-based non-woven fabrics, particularly papers.

In contrast to the widely spread technique the non-woven fabric used according to the invention is not impregnated. Thus, it exhibits its full flexibility and is not damaged when exerted to bending loads.

Particularly preferred the non-woven fabric is a paper, in particular a so-called print base paper. This kind of papers are commercially available and, for example, are used for the production of printed decorative papers. They can be coloured. According to the invention an already printed decorative paper can also be used. The area density of these papers is appropriately in the range of ≥20 to ≤150 g per square meter.

The adhesives used according to the invention preferably are physically and chemically curing adhesives, particularly on the base of polyurethanes. Particularly preferred are reactive hot melt adhesives. They are applied to a first surface of the carrier or to a surface of the non-woven fabric in the molten state at temperatures of, for example, ≥110 to ≤200° C., preferably up to 130° C. Immediately after the application the non-woven fabric is laid onto the first surface of the carrier, wherein the bonding of the non-woven fabric with the carrier is obtained by cooling down and solidifying the hot melt adhesive. Herein, for guiding and flattening purposes the non-woven fabric can be pressed onto the carrier surface by a laminating roller, such as a rubber calendar roll. Suitable hot melt adhesives include polyurethanes. This kind of reactive hot melt adhesives are disclosed, for example, in EP 777695 B2. Basically reaction adhesives including two components can be used, too, however, herein the handling is more elaborate since the period from blending to laminating and also the temperature have to be maintained constantly. Even simple hot melt adhesives (hotmelts) can be used. Moreover, cold setting one, two or multi-component adhesives as well as dispersion adhesives (PVA glue) or cold glues are appropriate, which can be compressed and used, respectively, even up to a temperature of 80° Celsius.

The adhesive is applied onto the surface of the carrier, for example, by means of a preferably heated applicator roll. When using a thermoplastic carrier it has to be ensured that the carrier will not to be heated such an extend that it will be softened. As soon as possible after application of the adhesive the non-woven fabric (for example decorative paper or print base paper) is laid onto the hot melt adhesive layer. When using a reactive hot melt adhesive (RAPIDEX NP2075LT, H.B. Fuller Deutschland GmbH, Nienburg) the appropriate temperature of the adhesive was 120° C. and the area density was 55 g per square meter.

Alternatively the hot melt adhesive can be applied onto a surface of the non-woven fabric. Basically this can also be done by means of an applicator roll if the non-woven fabric is supported in this process, for example, by means of a roller. However, in this case the molten hot melt adhesive preferably is sprayed onto the non-woven fabric by means of a nozzle system.

This method enables a larger throughput compared to the roller coating onto the carrier. Appropriate temperatures of the hot melt adhesive within the nozzle system are in the range between ≥120 and ≤200° C., particularly between ≥120 and ≤150° C. This method basically also allows to coat the first surface of the carrier with a hot melt adhesive before the non-woven fabric is laminated.

The amount of the hot melt adhesive and the process parameters such as temperature, throughput, period from application to lamination have preferably to be selected such that the non-woven fabric will not be soaked with the liquid hot melt adhesive. Preferably the pores of the non-woven fabric should remain open and not be filled by the hot melt adhesive.

After laminating the non-woven fabric (paper) onto the surface of the carrier this composite material can be stored as an intermediate product over any time period.

If the non-woven fabric used does not yet comprise a décor, such as a print base paper, now a decor can be printed onto the exposed surface. To this end known print methods can be used such as gravure printing, offset-printing, letterpress printing, ink jet printing, laser printing, digital printing, transfer printing, both in the form of a sheet and a rotary printing process. The printing can be monochrome or multi-coloured. It has been found that the surface of the carrier laminated with the non-woven fabric is much better suited for printing than the surface of the carrier itself. Particularly the adherence of the print ink is improved.

In the next process step the non-woven fabric is impregnated with a liquid agent. The impregnation agent preferably consists of one component. Agents comprising two components which are applied successively onto the non-woven fabric are also useful. Herein, at first the fiber structure of the non-woven fabric is wetted with one component without to be fully impregnated. Subsequently the second component is applied, whereby both constituents are blended such that hardening by cross-linking occurs. The components of the system can also be blended together before the application step. Preferably this system is radiation sensitive such that the cross-linking can be accelerated by electromagnetic radiation, such as UV radiation, IR radiation, NIR radiation (near infrared) or electron beams. Thermosetting impregnation agents are useful, too.

If instead of a not yet printed non-woven fabric a non-woven fabric already provided with a desired decor is used, it can at least partially be impregnated before it is laminated onto the carrier plate.

A preferred class of impregnation agents adapted to be cross-linked by radiation includes unsaturated polyester and epoxy acrylates as well as appropriate photoinitiators known per se.

The application of the impregnation agent and its components, respectively, is implemented, for example, by spraying, dosing rollers or pouring and levelling out. The application weight is determined based on the kind of the layer of the non-woven fabric, particularly its pore volume. Preferably an amount sufficient for a complete impregnation of the layer of the non-woven fabric will be applied.

The application and incorporation of the impregnation agent is preferably done with the aid of a roller to the surface of which a layer of an elastomer or rubber having a shore hardness (A) of ≥20 to ≤40, preferably ≥30, is provided and which is about ≥20 to ≤100 mm wider than the plate which is to be processed and to be provided with the non-woven fabric. This roller can dose the impregnation agent by itself or can be disposed downstream of another application means. This roller is biased with such a pressure that it it deforms slightly at the edges of the plate in the direction toward the lateral edge of the plate and the non-woven fabric. This results in a deeper impregnation of the non-woven fabric at the edges whereby the water resistance of the product from the edges is improved.

If an impregnation agent adapted to be cross-linked by UV radiation is selected now an irradiation step using radiation of a suited wavelength is implemented. This irradiation step can be implemented at room temperature or at a slightly increased temperature of, for example, up to 60° C. Accordingly an impregnation agent adapted to be cross-linked by electron beams is exposed to an electron beam.

Cross-linking and curing of the impregnation agent results in the formation of an extremely strong decoration layer on the carrier. A person skilled in the art surprisingly observed that the impregnation agent impregnates the layer of the non-woven fabric adhered with one surface to the carrier to such a sufficient degree as is the case, when the separated decorative paper is impregnated even if the free surface is already printed. Obviously the printing ink does not represent any barrier to the impregnation agent.

As a wearing layer a composition is applied which preferably is compatible with the cured impregnation agent, i.e. it easily adheres at the impregnated decorative layer. Herein a system consisting of two components adapted to be cross-linked by radiation can be used, too. One-component systems are preferred.

Constituents which increase the abrasion resistance are incorporated into the wearing layer. Here particles of hard anorganic solids are contemplated such as aluminum oxide (corundum), silica (quartz), boron carbide, glass beads and the like. The Mohs scale of these materials should be at least 6. Their particle size is dimensioned such that it does not exceed the thickness of the wearing layer. Appropriate particle sizes are between ≥20 and ≤200 μm. In the case of systems adapted to be cross-linked by radiation, of course, an irradiation with UV radiation of an appropriate wavelength and electron beams, respectively, has to be implemented.

In order to incorporate the abovementioned hard particles they can be added to the composition intended for the production of the wearing layer before it is applied onto the impregnated layer of the non-woven fabric. Alternatively it is possible to apply a liquid composition without particles and to apply the latter subsequently, such as by spreading, such that it sinks into the layer.

A preferred one-component system for the production of the wearing layer includes epoxy acrylates and photoinitiators as components adapted to be cross-linked as well as corundum as an abrasion inhibiting solid additive.

Preferably the wearing layer is applied in at least two partial layers in which the addition amount of hard particles can be different. The first lower wearing layer, for example, is provided with larger particles and a second upper partial layer is provided with smaller particles, possibly even in a smaller amount. By doing so it can be avoided that individual particles protrude from the surface of the upper partial layer.

In addition a top layer can be coated onto the wearing layer, such as to improve the appearance of the finished product. This top layer, too, can consist of a composition adapted to be cross-linked by radiation. In this case, too, an irradiation with UV light of an appropriate wavelength is implemented. The top layer preferably has a thickness of 5 to 50 μm and preferably includes no particles for increasing the abrasion resistance.

The composition for the production of the top layer preferably includes polyester acrylate, epoxy acrylate and at least one photoinitiator.

By means of a textured surface, such as by means of a texture roller or an embossed sheet, the top layer can be provided with a surface texture to provide a certain depth and roughness for the surface. It is also possible to match this structure with the details of the decor in order to give the impression of a natural material such as wood.

It can be preferable that the layers of the compositions adapted to be cross-linked by radiation in the individual process stages are not irradiated so long that they completely cure. In this case after application of the last layer or after embossing the top layer a final irradiation process for completely curing is implemented.

According to the intended use of the product either the wearing layer or the top layer can be omitted. Thus, for example, with respect to panels intended to be applied to walls or ceilings a wearing layer can be dispensable since in this case only low mechanical loads are expected. Likewise, the top layer can be omitted, if only the wearing resistance and not the appearance is of concern.

As an alternative to the usage of compositions adapted to be cured by radiation compositions can be used for the impregnation of the adhered non-woven fabric, the wearing layer and the top layer in which the cross-linking and curing can be implemented by heating and under pressure, if necessary. However, it has been proved advantageous to respectively use the same type of compositions for all three layers—adapted to be cross-linked either by radiation or by heating.

The process steps described above for producing the decorated wall, ceiling or floor panels according to the invention can be performed efficiently using large dimensions of, for example, 1×3 meters, or even in a continuous operation, if the carrier plate can be provided continuously. Normally, however, the thus produced plates are mounted in smaller sizes as panels or planks such that the large dimensions have to be cut. A step for cutting the large dimensions can basically be inserted at an arbitrary stage of the process. Preferably it is implemented after the lamination and before the impregnation of the non-woven fabric or after the finishing of the product. If the product is cut before the impregnation step the side surface of the partial plates can be sealed watertightly, for example by use of the impregnation liquid, simultaneously with or independent from the application of the impregnation liquid and/or the wearing and top layers, which results in panels that are adapted to be processed like ceramic tiles. After the cutting step appropriate coupling systems can be attached, if necessary. If an unprinted print base paper has been laminated onto the carrier, the cutting step can be implemented subsequently and the individual panels or planks can each be printed with different patterns, whereby a high flexibility of the production process is achieved. Moreover, in computer-controlled print processes without a fixed print form, such as ink jet or laser printing, different patterns can be produced easily in a simple way, whereby the impression of natural materials is achieved.

The second surface of the carrier, i.e. the surface of the carrier opposite to the surface treated by the process of the invention, basically can be processed into a decorative surface using the same process. In many cases in the mounted state only one decorative surface is visible. However, in order to ensure the flatness of the product under varying temperature and moisture conditions a so-called counter tension element can be attached to the second surface of the carrier. This counter tension element can also be produced according to the process of the invention, wherein the decor can be omitted and a simpler non-woven fabric and cheaper compositions for the impregnation can be used. Then a plate is obtained which is watertight at the second surface, too. To this end it may be sufficient to dispense with the lamination of a non-woven fabric and to solely apply an appropriate composition, such as an impregnation agent or top layer composition. The counter tension element preferably can be applied before or subsequent to the lamination of the first surface and before the cutting of the plate into smaller sizes.

By use of the process according to the invention decorative wall, ceiling and floor panels with an excellent quality can be produced in a much simpler way than according to the prior art. By means of the lamination with use of an adhesive the adherence of the decorative layer and the overlying layers to the carrier can be adjusted independently from the kind of the carrier and the compositions of the impregnation. Thus previously observed problems of the adherence of aminoplastic resins on polymeric plastic materials such as PVC are overcome.

However, a person skilled in the art of course is aware that the invention can be realised with use of an adhesive in the temperature range of ≥60 to ≤110° C. Herein preferably polyurethane-based adhesives are used to which according to the application materials with low melting point, preferably resins, are added. Another alternative includes adhesives made of a composition of polymers, waxes, oils, resins, stabilizers and plasticizers.

The invention is explained in detail with reference to the following examplary embodiment.

A plate made of soft PVC of 1×3 m is coated with a reactive hot melt adhesive (55 g per square meter) in a roll coating system by means of an applicator roll heated to 120° C. As soon as possible a print base paper is laid onto the yet liquid adhesive and pressed by means of a rubber calendar roll and a counter pressure roll. After a cooling step the image of a wood veneer is printed onto the surface within a four-colour printing machine. In this state the plate can be stored for any period as a semi-finished product.

Now the plate is cut into planks with the size 25×60 cm and by means of a rubberised roll, the upper layer of which comprises a shore (A) hardness of ≥30 and which is slightly wider than the planks, an UV curing impregnation agent comprising polyester acrylate and epoxy acrylate is applied with an area density of 25 g/m$^2$ and irradiated with UV radiation.

Subsequently a UV curing composition including an amount of about 20% by weight corundum (average particle size 25 µm) is applied to an area density of 30 g/m$^2$ by means of a roll and is slightly gelatinized by means of UV radiation, i.e. partially cured. This process is repeated once.

Finally a top layer made of an UV curing varnish comprising polyester acrylate and epoxy acrylate is applied to an area density of 7 g/m$^2$.

The entire laminated structure now is again irradiated with UV radiation until a sufficient curing degree is achieved.

As a result planks are obtained which after sealing the lateral edges and the bottom surface are completely watertight.

The invention claimed is:

1. Method for producing a decorated wall, ceiling or floor panel, comprising the steps of:
    a) providing a plate-shaped carrier and a non-woven fabric;
    b) applying an adhesive to a surface of the carrier or a surface of the non-woven fabric;
    c) laminating the non-woven fabric by means of the applied adhesive to the surface of the carrier;
    d) impregnating the non-woven fabric with an impregnation agent, wherein the impregnating is performed by a rubber roller which has a shore (A) hardness of 20 to 40 and the rubber roller protrudes from the carrier in the direction of the roller axis by at least 20 mm; and
    e) curing the impregnation agent;
    wherein the carrier is a plastic carrier and the non-woven fabric is a print base paper; and
    printing a décor onto the paper between steps c) and d).

2. Method according to claim 1, comprising the further process steps:
    f) applying a wearing layer and curing the wearing layer; and/or
    g) applying a top layer and curing the top layer.

3. Method according to claim 1, characterized in that the non-woven fabric is a decorative paper.

4. Method according to claim 1, characterized in that the adhesive is a hot melt adhesive.

5. Method according to claim 4, characterized in that the hot melt adhesive is a reactive hot melt adhesive.

6. Method according to claim 1, characterized in that the impregnation agent, the composition for producing the wearing layer and/or the composition for producing the top layer comprise components are adapted to be cross-linked by radiation and each curing step is implemented by means of electromagnetic radiation.

7. Method according to claim 1, characterized in that the impregnation agent consists of at least two components and impregnating step (d) comprises successively impregnating the two components into the non-woven fabric.

8. Method according to claim 1, characterized in that at least one of the compositions for the impregnation agent, the wearing layer or the top layer includes at least a polyester acrylate, an epoxy acrylate and a photoinitiator.

9. Method according to claim 1, characterized in that the composition for producing the wearing layer includes particles of a solid with a Mohs hardness of at least 6.

10. Method according to claim 1, characterized in that the impregnation agent, the composition for producing the wearing layer and/or the composition for producing the top layer include components adapted to be cross-linked by heat and the curing step is implemented by heating.

11. Method according to claim 1, characterized in that the carrier is cut between steps c) and d), and the carrier is sealed watertightly at lateral surfaces.

12. Decorated wall, ceiling or floor panel produced by a method according to claim 1.

13. Method according to claim 2, characterized in that the impregnation agent, the composition for producing the wearing layer and/or the composition for producing the top layer comprise components adapted to be cross-linked by radiation and each curing step is implemented by means of electromagnetic radiation.

14. Method according to claim 2, characterized in that the impregnation agent consists of at least two components and impregnating step (d) comprises successively impregnating the two components into the non-woven fabric.

15. Method according to claim 2, characterized in that at least one of the compositions for the impregnation agent, the wearing layer or the top layer includes at least a polyester acrylate, an epoxy acrylate and a photoinitiator.

16. Method according to claim 1, characterized in that the composition for producing the wearing layer includes particles of a solid with a Mohs hardness of at least 6.

17. Method according to claim 2, characterized in that the impregnation agent, the composition for producing the wearing layer and/or the composition for producing the top layer comprise components adapted to be cross-linked by radiation and each curing step is implemented by means of electromagnetic radiation;
    the impregnation agent consists of at least two components and impregnating step (d) comprises successively impregnating the two components into the non-woven fabric;
    at least one of the compositions for the impregnation agent, the wearing layer or the top layer includes at least a polyester acrylate, an epoxy acrylate and a photoinitiator.

18. Method according to claim 15, characterized in that the composition for producing the wearing layer includes particles of a solid with a Mohs hardness of at least 6.

19. Method according to claim 1 wherein the rubber roller protrudes from the carrier in the direction of the roller axis by between 20 mm and 100 mm.

20. Method according to claim 1, characterized in that the impregnation agent consists of at least two components which are blended together before step (d) impregnating into the non-woven fabric.

21. Method according to claim 2, characterized in that the impregnation agent consists of at least two components which are blended together before step (d) impregnating into the non-woven fabric.

22. Method according to claim 2, characterized in that the impregnation agent, the composition for producing the wearing layer and/or the composition for producing the top layer comprise components adapted to be cross-linked by radiation and each curing step is implemented by means of electromagnetic radiation;
 the impregnation agent consists of at least two components which are blended together before step (d) impregnating into the non-woven fabric
 at least one of the compositions for the impregnation agent, the wearing layer or the top layer includes at least a polyester acrylate, an epoxy acrylate and a photoinitiator.

\* \* \* \* \*